United States Patent

[11] 3,575,603

| [72] | Inventor | David W. Schlicher<br>Minneapolis, Minn. |
|---|---|---|
| [21] | Appl. No. | 18,864 |
| [22] | Filed | Mar. 12, 1970 |
| [45] | Patented | Apr. 20, 1971 |
| [73] | Assignee | Electric Machinery Mfg. Company<br>Minneapolis, Minn. |

[54] TIME ERROR CONTROL FOR GENERATOR FREQUENCY GOVERNOR
8 Claims, 4 Drawing Figs.

[52] U.S. Cl. .................................................. 290/40, 318/601
[51] Int. Cl. .................................................. H02p 9/04
[50] Field of Search .......................................... 318/601, 600; 290/40, 40 (A), 40 (B)

[56] References Cited
UNITED STATES PATENTS

| 3,206,665 | 9/1965 | Burlingham.................. | 318/601 |
| 3,219,895 | 11/1965 | Price............................ | 318/601 |
| 3,242,346 | 3/1966 | Skoubo........................ | 290/40 |
| 3,452,258 | 6/1969 | Thompson.................... | 290/40 |

*Primary Examiner*—G. R. Simmons
*Attorney*—Ikel C. Benson

ABSTRACT: A time error control operated continuously in conjunction with the frequency control of a power-driven alternating current generator to momentarily modify the performance of the frequency control to reduce the time error caused by variations in frequency between the system and standard, thus giving accurate time at all times and within extremely close limits by clocks operated by the current generated by the generator.

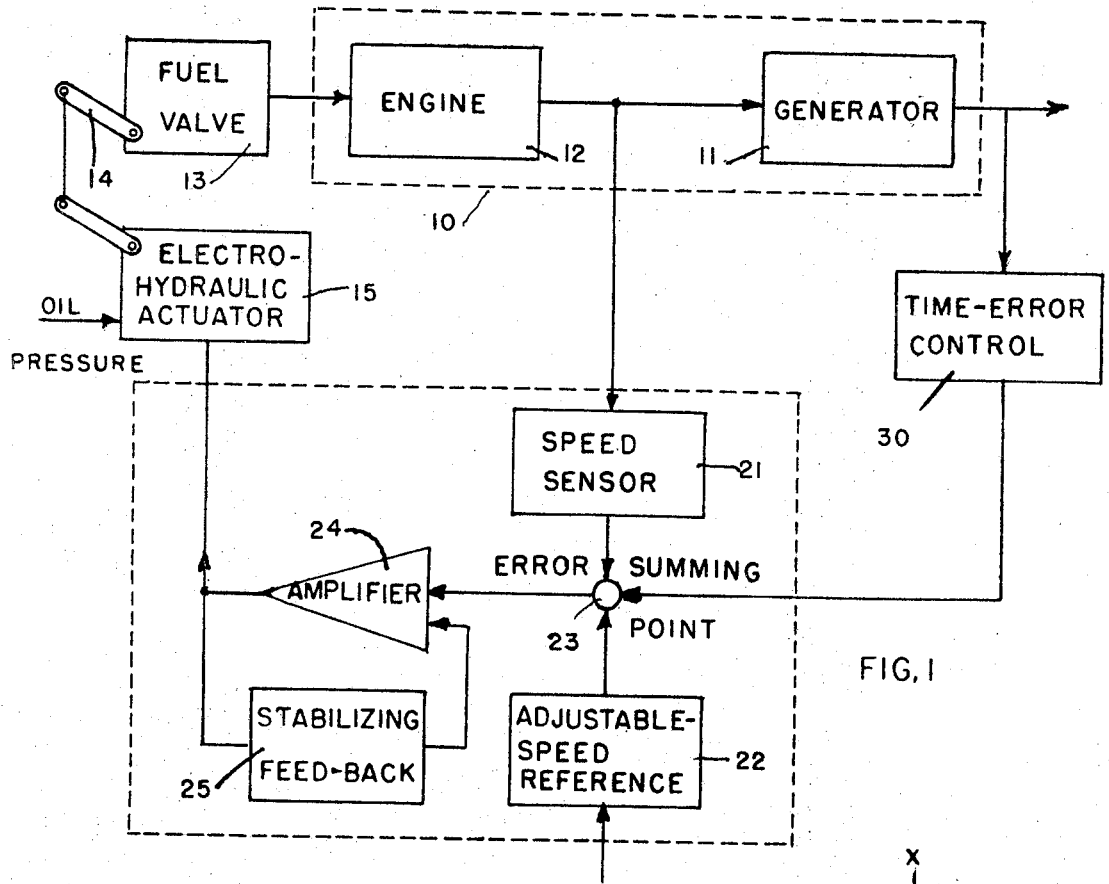
FIG. 1
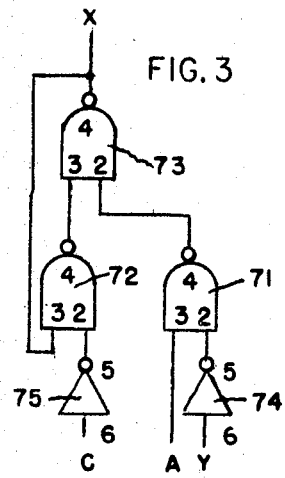
FIG. 3
$X = X \cdot \overline{C} + A \cdot \overline{Y}$
FIG. 4
| CONDITIONS | INPUTS | | | OUTPUTS |
|---|---|---|---|---|
| | A | C | Y | X |
| BETWEEN PULSES | L | L | | NO CHANGE |
| ON | H | L | | H |
| OFF | L | H | L | L |
| SIMULTANEOUS ON-OFF PULSES | H | H | | H |
| BETWEEN PULSES | L | L | | NO CHANGE |
| ON | H | L | | NO CHANGE |
| OFF | L | H | H | L |
| SIMULTANEOUS ON-OFF PULSES | H | H | | L |
INVENTOR.
DAVID W. SCHLICHER
BY
*Akel C. Benson*
ATTORNEY

TIME ERROR CONTROL FOR GENERATOR FREQUENCY GOVERNOR

PRIOR ART

In the prior art, the regulation of time is procured by varying the frequency of the system at specified times thus causing inaccurate readings between times. The instant invention provides continuous monitoring and instead of correcting the frequency of the frequency control, utilizes it as it is and modifies it for sufficient lengths of time to add or subtract the number of cycles lost or gained in an extremely short interval of time.

In the drawings:

FIG. 1 is a block diagram of an alternating current generator driven by an internal combustion engine and a frequency regulator for adjusting the frequency of the generator and to which the instant invention is applied.

FIG. 3 is a detached view of the lag latching circuit.

FIG. 4 is a truth table for the logic elements of the invention.

Figure 2:
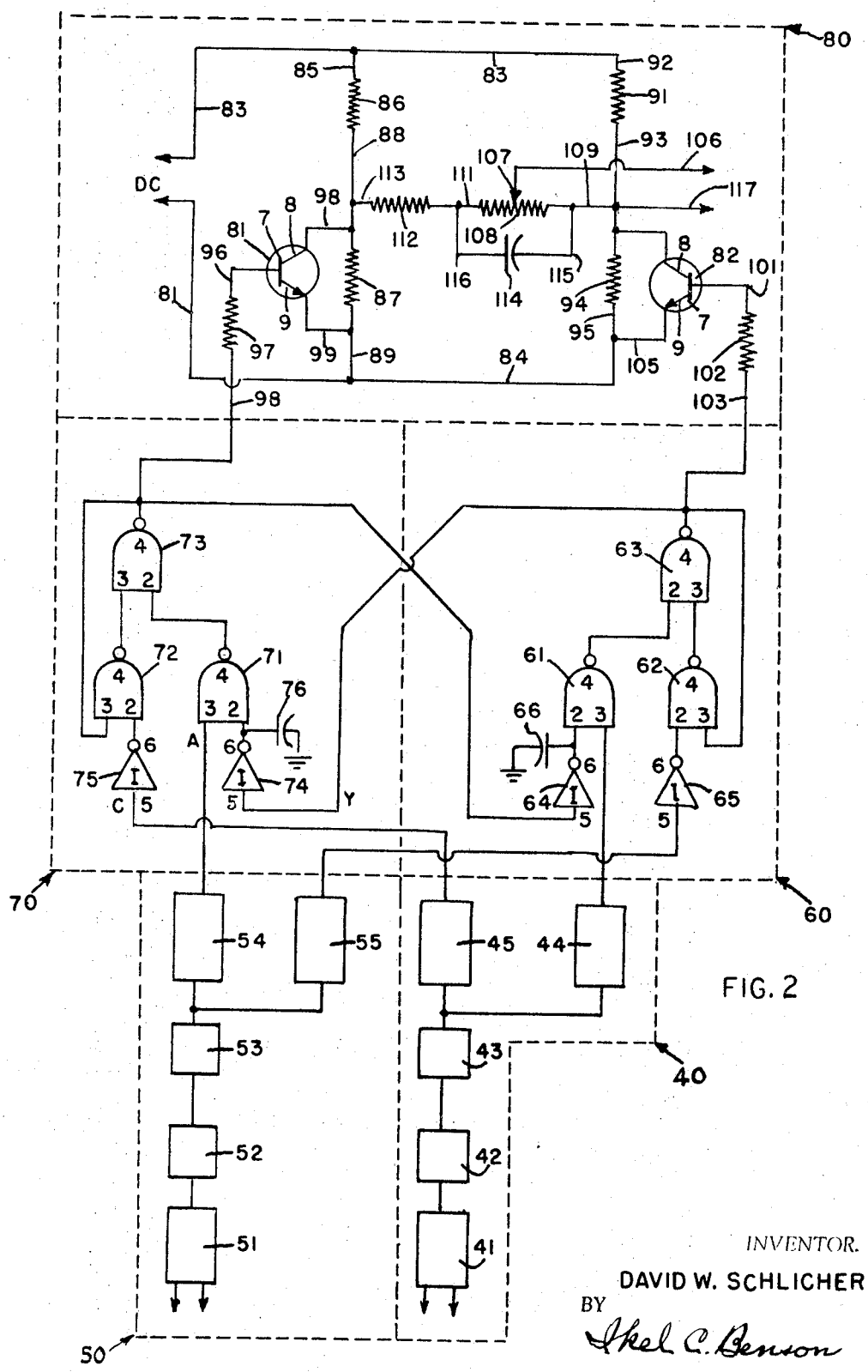
FIG. 2 is a block and logic diagram of a time-error control illustrating an embodiment of the invention.

For the purpose of illustrating the application of the invention a power plant 10 and frequency governor 20 has been shown in FIG. 1 and to which the time-error control has been applied.

POWER PLANT

The power plant 10 includes a generator 11 driven by an internal combustion engine 12. An adjustable fuel valve 13 regulates the fuel fed to the engine 12. A mechanical linkage 14 connected to the valve 13 and to a hydraulic actuator 15 serves to adjust the valve to regulate the speed of the engine and the frequency of the output of the generator.

FREQUENCY REGULATOR

The frequency regulator 20 shown in FIG. 1 includes a speed sensor 21 and an adjustable speed reference 22 both of which are connected to a summing point 23. The speed sensor is operated by the generator 11 while the adjustable speed reference may be operated independently of the generator in any suitable manner. The output from the summing point is amplified by an amplifier 24 which actuates the electrohydraulic actuator 15. A stabilizing feedback 25 is connected to the amplifier 24 and feeds back to the amplifier a stabilizing signal. The construction of the frequency regulator and power plant being old in the art has not been shown in detail.

TIME-ERROR CONTROL

The time-error control is indicated by the reference numeral 30 and comprises system pulse producing means 40, standard pulse producing means 50, a lead latching circuit 60, a lag latching circuit 70 and a proportional output amplifier 80.

SYSTEM PULSE PRODUCING MEANS

The system pulse producing means 40 utilizes the system voltage which is connected to a wave shaper 41 producing a square wave of the system frequency. This wave shaper is connected to a 4-bit binary counter 42 which produces a square wave having a frequency of 3.75 hertz. This counter feeds into another 4-bit binary counter 43 which further reduces the frequency to approximately 0.234 hertz making slightly over 4.26 seconds for each complete cycle. The output of 4-bit binary counter 43 feeds a turn-on pulse generator 44 and a turnoff pulse generator 45. These pulse generators convert the alternating current from 4-bit counter 43 to shortened pulses of the same polarity with appreciable time spaces therebetween.

STANDARD PULSE PRODUCING MEANS

The standard pulse producing means 50 utilizes a crystal oscillator 51 which has a crystal ground to oscillate at a frequency which provides standard frequency in the system current for the desired operation. This oscillator produces square-wave pulses at the standard frequency. This oscillator is connected to a 4-bit binary counter 52 which in turn feeds to another 4-bit binary counter 53 which feeds a turn-on pulse generator 54 and a turnoff pulse generator 55. The 4-bit binary counters 52 and 53 are identical with the 4-bit binary counters 42 and 43 while the pulse generators 54 and 55 are identical with the pulse generators 44 and 45.

LEAD LATCHING CIRCUIT

The lead latching circuit 60 has first, second, and third NAND gates 61, 62 and 63 each of which has first and second input terminals 2 and 3 and an output terminal 4. Said circuit also has two inverters 64 and 65, each of which has an input terminal 5 and an output terminal 6. The output terminals 6 of the inverters 64 and 65 are connected to the input terminals 2 of gates 61 and 62. The output terminal of the turnoff pulse generator 55 is connected to the input terminal 5 of inverter 65 while the output terminal of turn-on pulse generator 44 is connected to input terminal 3 of gate 61. The input terminal 3 of gate 62 is connected to the output terminal 4 of gate 63. The output terminals 4 of the gates 61 and 62 are connected to the input terminals 2 and 3 of the gate 63. The output terminal 6 of inverter 64 is connected to a capacitor 66 which is grounded.

LAG LATCHING CIRCUIT

The lag latching circuit 70 is similar to the lead latching circuit 60 and has its first, second and third NAND gates 71, 72 and 73, each having two input terminals 2 and 3 and an output terminal 4. Said circuit also has two inverters 74 and 75, each of which has an input terminal 5 and an output terminal 6. The output terminals 6 of the inverters 74 and 75 are connected to the input terminals 2 of gates 72 and 72.

The output terminal of the turnoff pulse generator 45 is connected to the input terminal 5 of inverter 75 while the output terminal of turn-on pulse generator 54 is connected to the input terminal 3 of gate 71. The input terminal 3 of gate 72 is connected to the output terminal 4 of gate 73. The output terminals 4 of gates 71 and 72 are connected to the input terminals 2 and 3 of gate 73. The output terminal 6 of inverter 74 is connected to a capacitor 76 which is grounded. The output terminal 4 of gate 63 is also connected to the input terminal 5 of inverter 74 while the output terminal 4 of gate 73 is connected to the input terminal 5 of inverter 64.

PROPORTIONAL OUTPUT AMPLIFIER

The proportional output amplifier 80 utilizes two NPN transistors 81 and 82 each having a base 7, a collector 8 and an emitter 9. Two conductors 83 and 84 are connected to the plus and negative sides respectively of a direct current source not shown. Connected to the conductor 83 by means of a conductor 85 is a resistor 86 which is connected to another resistor 87 by a conductor 88. The resistor 87 is connected to the conductor 84 by means of a conductor 89. In a similar manner a resistor 91 is connected to the conductor 83 by means of a conductor 92. This resistor is further connected by a conductor 93 to another resistor 94 which in turn is connected by a conductor 95 to the conductor 84.

The base 7 of transistor 81 is connected by means of a conductor 96 to a resistor 97 which in turn is connected by means of a conductor 98 to the output 4 of gate 73 of the lag latching circuit 70. The collector 8 of transistor 81 is connected by a conductor 93 to conductor 88 while the emitter 9 of transistor 81 is connected by means of a conductor 99 to the conductor 84.

The base 7 of transmitter 82 is connected by a conductor 101 to a resistor 102 which in turn is connected by a conductor 103 to the output 4 of the gate 63 of the lead latching circuit 60. The collector 8 of transistor 81 is connected by a conductor 104 to the conductor 93 while the emitter 9 of transistor 82 is connected by a conductor 105 to the conductor to conductor 95.

One output terminal 106 of the proportional output amplifier 80 is connected to the movable contact 107 of a voltage divider 108. One end of this voltage divider is connected by a conductor 109 to the conductor 93 while the other end of this voltage divider is connected by a conductor 109 to the conductor 93 while the other end of this voltage divider is connected by a conductor 111 to a resistor 112. The other end of the resistor 112 is connected to the conductor 88 by means of a conductor 113. The resistor 108 is shunted by means of a capacitor 114 which is connected by means of conductors 115 and 116 to conductors 109 and 111. The other output terminal 117 of the proportional amplifier 80 is directly connected to the conductor 93.

The input of the time-error control 30 is connected to the output of the generator while the output of the time-error control is connected to the summing point 23.

The operation of the invention is as follows:

A continuous count of all cycles of both frequency sources is maintained by counting blocks of 256 cycles of 4¼ seconds duration and then providing marker pulses which can be compared to determine the time difference to generate the same number of cycles. The number of cycles in each block was selected because of the availability of 4-bit counters and the use of two of these provides this division. One block also represents the maximum error that can be stored so this cannot be made too short or the storage error may be reached before there is an opportunity to make a suitable frequency correction.

As stated, the output of the frequency standard is divided by 256 and the divided output is fed into pulse generators 54 and 55. In a similar manner the system frequency is divided and fed to pulse generators 44 and 45. These pulses are used to turn-on and turnoff the latching circuits 60 and 70, the latching circuit 70 storing lag-time error and the latching circuit 60 storing lead-time error. The time error, as represented by the on-time of the latch circuit, is fed into the proportional output amplifier 80. Between lead-time error and lag-time error the output polarity reverses so that frequency corrections can be made in both directions. Pulse generator 54 provides a turn-on pulse for the lag-time latch circuit 70 while pulse generator 45 provides a turnoff pulse. In a similar manner pulse generator 44 turns on the lead-time latch circuit and pulse generator 55 turns it off. After a latch circuit is once turned on, it seals in and also provides a lockout signal to the other latch circuit.

FIG. 3 shows the lag-time latch circuit with its truth table shown in FIG. 4. The circuit consists of the three two-input NAND gates 71, 72 and 73 and the two inverters 74 and 75. The truth table shows how the circuit responds to pulses from the pulse generators 54 and 45 with both states of the Y output of the lead-time latch circuit. It will be noted that when Y is low, the circuit responds to the $A$ and $C$ pulses. When Y is high, the circuit is locked out and does not respond to the on pulses. The lead-time latch circuit responds in a similar manner with input pulses $B$ and $D$. The circuit which responds at any time depends on which frequency provides the turn-on pulse first.

Assume that we start at a time when pulses are occurring simultaneously. Now if the system frequency is lower than the standard frequency, the time period for 256 cycles would be longer and each subsequent pulse produced by the system frequency would occur after the corresponding pulse produced by the standard frequency. Thus the $A$ pulse would occur before the $D$ pulse and the lag-time latch circuit would respond. The OFF pulse is the $C$ pulse produced by the system frequency. Since the time error is the time interval between the two sets of pulses, the latch circuit is on for the time error during each 256 cycle time period. This one latch will continue to operate until the frequency has been increased to above that of the standard and the time error reduced to zero. If now the system frequency remains high, time will be gained and the $C$ and $D$ pulses will occur first and the lead-time latch circuit will start responding to the $D$ on-pulse and $B$ off-pulse and will continue to respond until the frequency has been lowered and the time error reduced to zero.

The truth table of FIG. 4 also points out the need for one of the features of this invention. With no time error there would be simultaneous ON and OFF pulses. During the period that both pulses are present, the circuit is turned on but since there is no error the circuit should not stay on. If the OFF pulse ends before the ON pulse, the circuit will stay latched on until the next OFF pulse which will not be for 256 cycles. This must not happen so it is necessary to insure that the OFF pulse remains after the ON pulse ends. To accomplish this, the OFF pulses are made longer than the ON pulses. With the longer OFF pulse, but with these starting to lead the ON pulse, we again can reach a point where the OFF pulse ends before the ON pulse. This will not cause any trouble if the other ON pulse has had time to turn on the other latch circuit and feed back a lockout signal. With circuit delays involved with the particular components used, I find that using a 2-microsecond ON pulse requires at least a 10-microsecond OFF pulse. A considerably longer OFF pulse, on the order of 1 millisecond, can be used to eliminate any possibility of marginal design.

Another possibility of misoperation can occur when one latch turns off. Simultaneously the other latch receives an ON pulse but should be prevented from turning on by maintaining the lockout signal until after the ON pulse ends. This is accomplished by the use of the two capacitors 66 and 76 shown in FIG. 2, which provide the necessary time delay.

Having described the invention, what is claimed as new and desired to be protected by Letters Patent is:

I claim:

1. A time-error control applicable to the frequency governor of an alternating current generator driven by an internal combustion engine, the governor of which has a speed sensor variable according to the speed of the generator and a speed reference, both connected to a summing point which in turn is connected to an amplifier feeding an electrohydraulic actuator which in turn operates a fuel valve controlling the speed of the engine, said time-error control comprising:

a. means for producing standard current pulses of the standard frequency,
b. means for providing system current pulses of system frequency,
c. modifying means for reducing the standard frequency by a given factor and correspondingly increasing the lengths of the standard pulses,
d. modifying means for reducing the system frequency by the same factor and increasing the length of the system pulses,
e. positive standard converting means converting the standard modified pulses into a number of time-spaced shorter pulses of positive polarity,
f. negative standard converting means converting the standard modified pulses into the same number of time-spaced shorter pulses of negative polarity,
g. positive system converting means converting the system modified pulses into the same number of time-spaced pulses of positive polarity,
h. negative system converting means converting the system modified pulses into the same number of time-spaced shorter pulses of negative polarity,
i. a lag-time latching circuit,
j. a lead-time latching circuit,
k. said positive standard converting means and said negative system converting means being connected to said lag-time latching circuit, l. said negative standard converting means and said positive system converting means being connected to said lead-time latching circuit,
m. interconnecting means between said lag-time and lead-time latching circuits,
n. said lag-time and lead-time latching circuits comprising the standard and system time pulses, and
o. a proportional output amplifier controlled by the outputs of said latching circuits and modifying the operation of the power plant frequency governor.

2. A time-error control according to claim 1 in which:
a. the pulse-modifying means includes semiconductor counter means.

3. A time-error control according to claim 1 in which:
a. the pulse-modifying means includes two 4-bit binary counters.

4. A time-error control according to claim 1 in which:
a. the unlatch-modified shortened pulses are longer than the latch-modified shortened pulses.

5. A time-error control according to claim 1 in which:
a. the latching circuits are binary semiconductor networks.

6. A time-error control according to claim 1 in which:
a. the lag-time and lead-time latching circuits each have first and second inverters, and the first inverter of the lag-time latching circuit forms part of the negative system converting means, and the first inverter of the lead-time latching forms part of the negative standard converting means, and
b. said lag-time and lead-time latching circuits each have first, second and third NAND gates, each gate being provided with first and second inputs and an output,
c. the outputs of the first and second inverters of the lag and lead-time latching circuits are connected to the first inputs of the second and first gates of said circuits,
d. the standard turn-on pulse generator is connected to the second input of the first gate of the lag-time latching circuit,
e. the system turn-on pulse generator is connected to the second input of the first gate of the lead-time latching circuit,
f. the standard turnoff pulse generator is connected to the input of the first inverter of the lead-time latching circuit,
g. the system turnoff pulse generator is connected to the input of the first inverter of the lag-time latching circuit,
h. the output of the third gate of the lag-time latching circuit is connected to the second input of the second gate of said circuit, to the input of the second inverter of the lead-time latching circuit and to one input of the proportional amplifier,
i. the output of the third gate of the lead-time latching circuit is connected to the second input of the second gate of said circuit, to the input of the second inverter of the lag-time latching circuit and to the other input of the proportional amplifier,
j. the outputs of the first gates of the lag and lead-latching circuits are connected to the first inputs of the third gates of said respective latching circuits, and,
k. the outputs of the second gates of the lag and lead-latching circuits are connected to the second inputs of the third gates of said respective latching circuits.

7. A time-error control according to claim 6 in which:
a. a capacitor is connected to the output of the second inverter of each of the latching circuits.

8. A time-error control according to claim 1 in which the lag-time latching circuit includes:
a. three NAND gates each having two inputs and an output, and
b. two inverters.